United States Patent
Ichikawa (10) Patent No.: US 9,069,407 B2
(45) Date of Patent: Jun. 30, 2015

(54) DISPLAY CONTROL APPARATUS AND DISPLAY CONTROL METHOD

(71) Applicant: CANON KABUSHIKI KAISHA, Tokyo (JP)

(72) Inventor: Sho Ichikawa, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/659,187

(22) Filed: Oct. 24, 2012

(65) Prior Publication Data

US 2013/0120311 A1    May 16, 2013

(30) Foreign Application Priority Data

Nov. 11, 2011   (JP) .................................. 2011-247964

(51) Int. Cl.
| | |
|---|---|
| G06F 3/041 | (2006.01) |
| G09G 3/20 | (2006.01) |
| H04N 5/232 | (2006.01) |
| G06F 1/16 | (2006.01) |
| G06F 1/32 | (2006.01) |
| G06F 3/044 | (2006.01) |
| G09G 3/34 | (2006.01) |

(52) U.S. Cl.
CPC ................ G06F 3/0416 (2013.01); G09G 3/20 (2013.01); H04N 5/23293 (2013.01); G06F 1/1694 (2013.01); G06F 1/3265 (2013.01); G06F 3/044 (2013.01); G06F 2203/0381 (2013.01); Y02B 60/1242 (2013.01); G09G 3/3406 (2013.01); G09G 2320/0626 (2013.01); G09G 2330/022 (2013.01); G09G 2354/00 (2013.01)

(58) Field of Classification Search
None
See application file for complete search history.

(56) References Cited

U.S. PATENT DOCUMENTS

| | | | | |
|---|---|---|---|---|
| 2008/0167834 | A1* | 7/2008 | Herz et al. | 702/150 |
| 2009/0262211 | A1* | 10/2009 | Mori | 348/222.1 |
| 2011/0249165 | A1* | 10/2011 | Churei | 348/333.02 |

FOREIGN PATENT DOCUMENTS

| | | |
|---|---|---|
| CN | 201919056 U | 8/2011 |
| JP | 09-331472 | 12/1997 |
| JP | 2005-278043 | 10/2005 |

OTHER PUBLICATIONS

Jan. 7, 2015 Chinese Office Action that issued in Chinese Patent Application No. 201210455420.X.

* cited by examiner

Primary Examiner — Jason Olson
(74) Attorney, Agent, or Firm — Cowan, Liebowitz & Latman, P.C.

(57) ABSTRACT

A display control apparatus comprises a proximity detection unit which detects that an object has come close to the apparatus, a touch detection unit which detects that an object has come close to a display unit, and a control unit which, when the proximity detection unit detects approach of the object and the touch detection unit detects the approach of the object in a region of not smaller than a predetermined range on the display unit, controls not to perform a display, to reduce a luminance of the display unit, or to turn off the display unit, and when the proximity detection unit detects the approach of the object and the touch detection unit does not detect the approach of the object in the region of not smaller than the predetermined range on the display unit, controls to carry on the display.

12 Claims, 9 Drawing Sheets

DISPLAY CONTROL APPARATUS AND DISPLAY CONTROL METHOD

BACKGROUND OF THE INVENTION

1. Field of the Invention

The present invention relates to a display control apparatus and method, particularly relates to a display control technique of controlling the display based on a touch panel and a proximity detection result.

2. Description of the Related Art

Recently, an increasing number of image capturing apparatuses include an eyepiece viewfinder and a display arranged on the rear surface to determine the composition of a shooting object and confirm an image acquired by image capturing. Some image capturing apparatuses include a display capable of touch panel input so that the user can more easily operate the image capturing apparatus. However, when the user shoots an image while looking through the eyepiece viewfinder, he is dazzled if the display on the rear surface keeps ON. To solve this, Japanese Patent Laid-Open No. 09-331472 discloses a display control apparatus in which a light amount detection sensor installed in an eyepiece viewfinder determines the approach of an eye and a display on the rear surface is turned off.

It is also becoming popular to adopt a touch panel as both the display and operation unit of a mobile phone or the like. When the user speaks over the mobile phone while bringing it close to his ear, he does not need to see the display. In this case, if the illumination of the display is kept ON, it consumes power. Further, the user is dazzled by emission from the mobile phone brought close to the head (ear). To solve this, Japanese Patent Laid-Open No. 2005-278043 discloses a method of, when it is detected that a mobile phone has come close to the ear, turning off the backlight of the display and/or operation unit to avoid unwanted power consumption.

However, for a display capable of touch panel input, these conventional techniques may detect a touch operation erroneously as the approach of the head (approach of the eye or ear) of a user, and turn off the display unintentionally. The user may lose a portion of the touch panel he should touch, impairing operability.

SUMMARY OF THE INVENTION

The present invention has been made in consideration of the aforementioned problems, and realizes a display control apparatus and method for preventing the OFF operation of a touch panel and a decrease in operability upon erroneously detecting an operation other than a touch operation as the touch operation" to —preventing the OFF operation of a touch panel and a decrease in operability upon erroneously detecting a touch operation as an operation other than the desired touch operation.

In order to solve the aforementioned problems, the present invention provides a display control apparatus comprising: a display unit; a proximity detection unit configured to detect that an object has come close to the apparatus; a touch detection unit configured to be able to detect that an object has come close to the display unit; and a control unit configured to, when the proximity detection unit detects approach of the object and the touch detection unit detects the approach of the object in a region of not smaller than a predetermined range on the display unit, control not to perform a display on the display unit, to reduce a luminance of the display unit, or to turn off the display unit, and when the proximity detection unit detects the approach of the object and the touch detection unit does not detect the approach of the object in the region of not smaller than the predetermined range on the display unit, control to carry on the display on the display unit.

In order to solve the aforementioned problems, the present invention provides a display control method of an apparatus which has a display unit; a proximity detection unit configured to detect that an object has come close to the apparatus; and a touch detection unit configured to be able to detect that an object has come close to the display unit, the method comprising: a control step of, when the proximity detection unit detects approach of the object and the touch detection unit detects the approach of the object in a region of not smaller than a predetermined range on the display unit, controlling not to perform a display on the display unit, to reduce a luminance of the display unit, or to turn off the display unit, and when the proximity detection unit detects the approach of the object and the touch detection unit does not detect the approach of the object in the region of not smaller than the predetermined range on the display unit, controlling to carry on the display on the display unit.

In order to solve the aforementioned problems, the present invention provides a display control apparatus comprising: a display unit; a proximity detection unit configured to detect that an object has come close to the apparatus; a touch detection unit configured to be able to detect that an object has come close and to detect a touch operation; and a control unit configured to, when the proximity detection unit detects approach of the object and the touch detection unit detects the approach of the object in a region of not smaller than a predetermined range on the display unit, control not to perform a display on the display unit, to reduce a luminance of the display unit, or to turn off the display unit, and when the proximity detection unit detects the approach of the object and the touch detection unit does not detect the approach of the object in the region of not smaller than the predetermined range on the display unit, control to carry on the display on the display unit.

In order to solve the aforementioned problems, the present invention provides a display control method of an apparatus which has a display unit; a proximity detection unit configured to detect that an object has come close to the apparatus; and a touch detection unit configured to be able to detect that an object has come close and to detect a touch operation, the method comprising: a control step of, when the proximity detection unit detects approach of the object and the touch detection unit detects the approach of the object in a region of not smaller than a predetermined range on the display unit, controlling not to perform a display on the display unit, to reduce a luminance of the display unit, or to turn off the display unit, and when the proximity detection unit detects the approach of the object and the touch detection unit does not detect the approach of the object in the region of not smaller than the predetermined range on the display unit, controlling to carry on the display on the display unit.

According to the present invention, it can be prevented to turn off a touch panel and impair operability upon erroneously detecting an operation other than a touch operation as the touch operation.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings.

<Apparatus Configuration>

The functions and outer appearance of an image capturing apparatus according to an embodiment (the embodiment will exemplify a single-lens reflex digital camera) to which a display control apparatus according to the present invention is applied will be described with reference to FIGS. 1 and 2. Note that the present invention is not limited to an image capturing apparatus, and the first to third embodiments to be described later are also applicable to a touch panel type mobile phone and the like.

Figure 1:
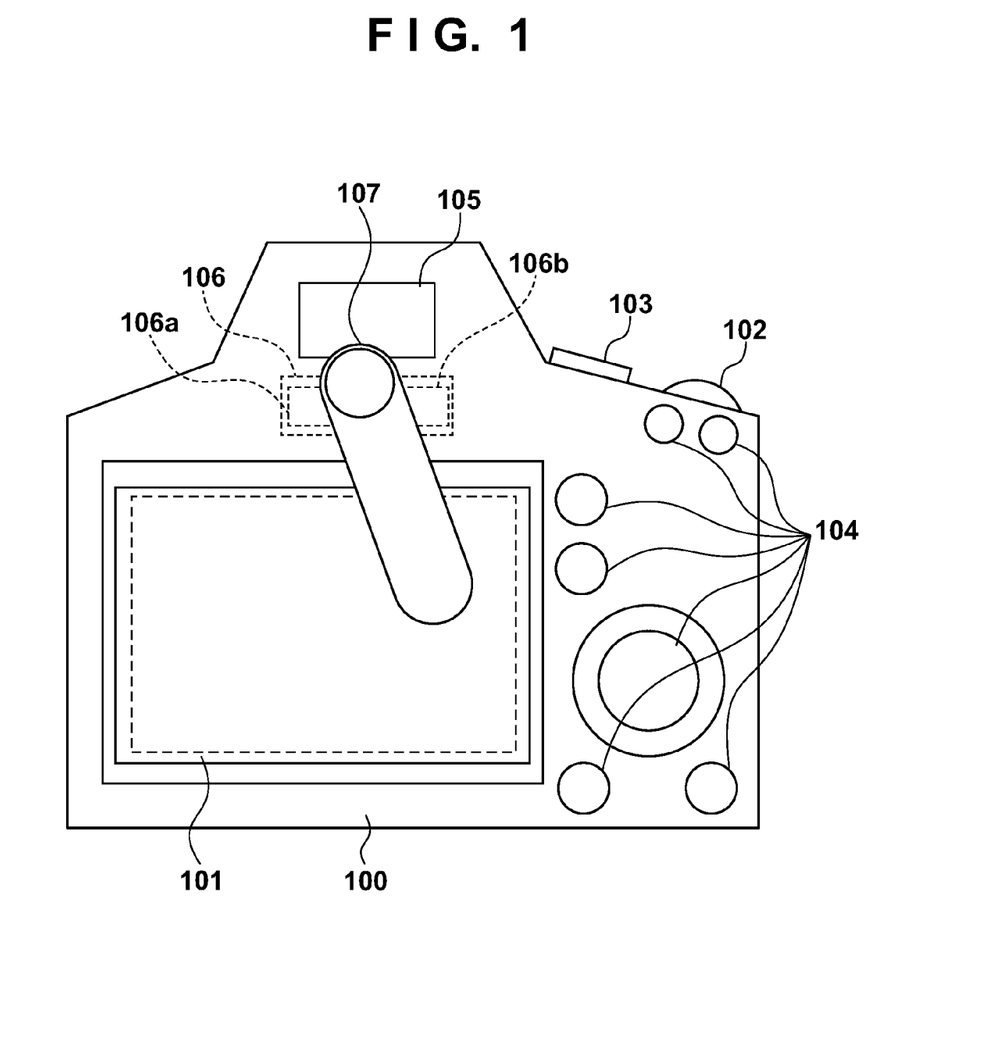
FIG. 1 is a view showing the outer appearance of an image capturing apparatus according to an embodiment of the present invention.

In an image capturing apparatus 100 shown in FIG. 1, a display 101 is, for example, an LCD panel which displays an image and various kinds of information. The display 101 is a touch panel display also serving as the function of an operation unit 104. A shutter button 102 is an operation unit for inputting a shooting instruction. A mode dial 103 is an operation unit for switching the operation mode of the image capturing apparatus 100. The operation unit 104 includes operation members such as various switches, buttons, and a touch panel for receiving a user operation.

The user uses an eyepiece viewfinder 105 to determine the composition of a shooting object. A proximity detection sensor 106 detects that an object is coming close to the eyepiece viewfinder 105. The proximity detection sensor 106 includes an infrared light-emitting lens window 106a and light-receiving lens window 106b. The infrared light-emitting lens window 106a emits infrared light at predetermined intervals, and the infrared light-receiving lens window 106b receives light reflected by an object 107 to be detected (to be described later). From the light amount, it can be determined whether the object 107 to be detected exists at a specific position.

Examples of the object 107 to be detected by the proximity detection sensor 106 are a face in the approach of an eye, and a finger in the touch operation.

Figure 2:
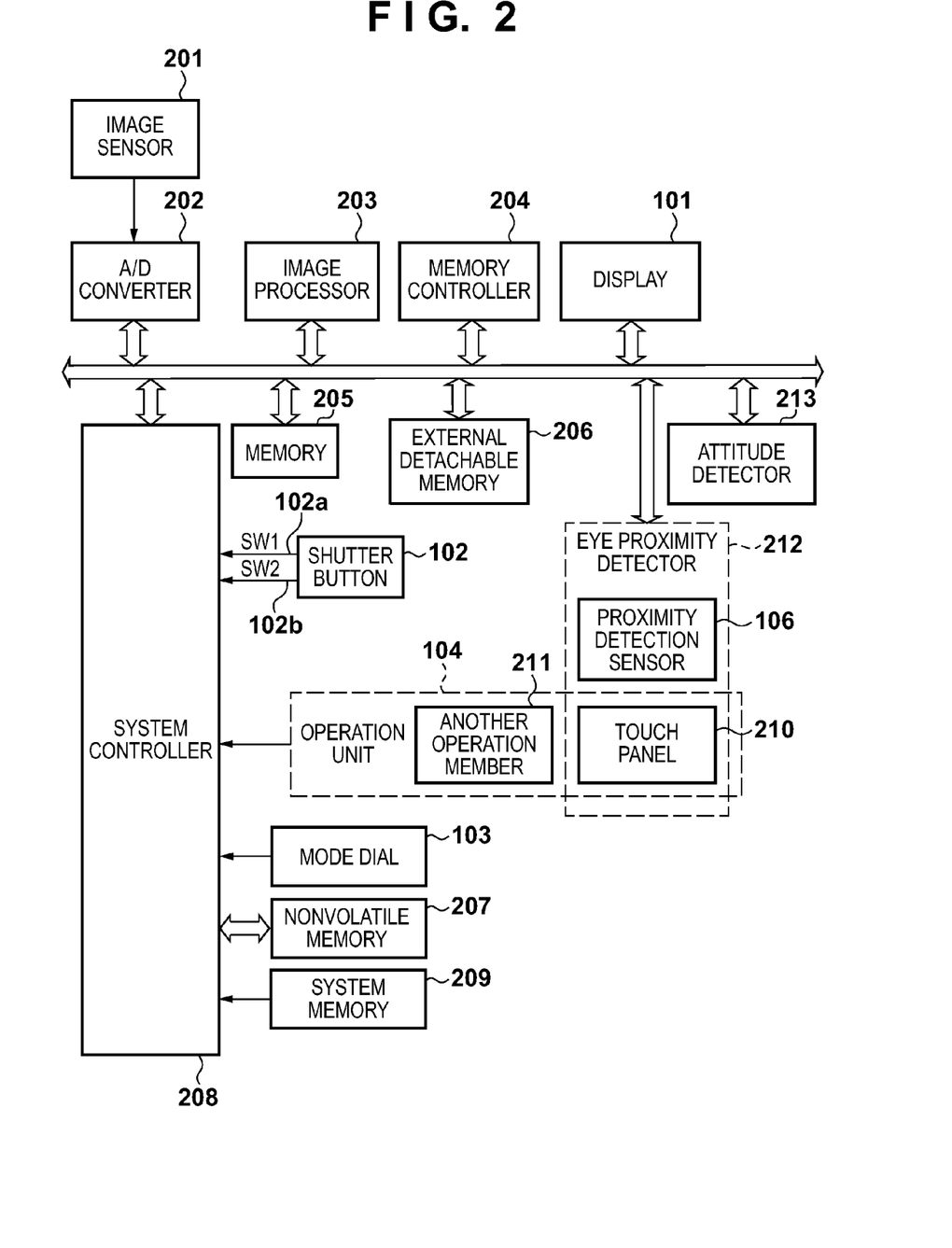
FIG. 2 is a block diagram showing the image capturing apparatus according to the embodiment of the present invention.

Referring to FIG. 2, an image sensor 201 is a CCD image sensor or CMOS image sensor which converts the optical image of a shooting object into an electrical signal. When the user presses the shutter button 102, the image sensor 201 forms the optical image of a shooting object via a lens (not shown) or the like, and performs photoelectric conversion.

An A/D converter 202 converts an analog electrical signal output from the image sensor 201 into a digital signal.

An image processor 203 performs predetermined pixel interpolation, resize processing such as reduction, and color conversion processing for data from the A/D converter 202 or data from a memory controller 204 (to be described later). The image processor 203 performs predetermined calculation processing using captured image data. Based on the obtained calculation result, a system controller 208 (to be described later) performs exposure control and distance measurement control. Accordingly, TTL (Through The Lens) AF (Auto Focus) processing, AE (Auto Exposure) processing, and EF (Electronic Flash pre-emission) processing are executed. Further, the image processor 203 performs predetermined calculation processing using captured image data. Based on the obtained calculation result, the image processor 203 also performs TTL AWB (Auto White Balance) processing.

The memory controller 204 controls data transmission/reception to/from the A/D converter 202, the image processor 203, the display 101, and a memory 205 and external detachable memory 206 (to be described later).

The memory 205 stores captured data which has been obtained by the image sensor 201 and converted into a digital signal by the A/D converter 202, and image data to be displayed on the display 101. The memory 205 has a storage capacity large enough to store a predetermined number of still images, a moving image of a predetermined time, and sound.

The external detachable memory 206 is a recording medium such as a memory card for recording a captured image. The external detachable memory 206 is formed from a semiconductor memory, magnetic disk, or the like.

A nonvolatile memory 207 is an electrically erasable/programmable memory, and uses an EEPROM or the like. The nonvolatile memory 207 stores the operation constants of the system controller 208 (to be described later), programs, and the like. The programs are those for executing flowcharts (to be described later).

The system controller 208 controls the overall image capturing apparatus 100. By executing a program recorded in the nonvolatile memory 207, the system controller 208 implements processing of each flowchart (to be described later). The system controller 208 also performs display control by controlling the memory 205, display 101, and the like.

A system memory 209 uses a RAM. The operation constants and variables of the system controller 208, programs read out from the nonvolatile memory 207, and the like are expanded in the system memory 209.

The mode dial 103, a first release switch 102a and second release switch 102b (to be described later), and the operation unit 104 form an operation device for inputting various operation instructions to the system controller 208 in accordance with a user operation.

The mode dial 103 switches the operation mode of the system controller 208 to one of the still image recording mode, moving image recording mode, and playback mode. Modes included in the still image recording mode are the auto shooting mode, auto scene determination mode, manual mode, various scene modes having shooting scene-specific shooting settings, program AE mode, and custom mode. The operation mode is directly switched by the mode dial 103 to one of these modes included in the still image shooting mode. Alternatively, after temporarily switching the operation mode to the still image shooting mode by the mode dial 103, it may be switched to one of these modes included in the still image shooting mode by using another operation member. Similarly, the moving image shooting mode may include a plurality of modes. The first release switch 102a is turned on by a so-called half stroke (shooting preparation instruction) during the operation of the shutter button 102 attached to the image capturing apparatus 100, generating a first release switch signal SW1. In accordance with the first release switch signal SW1, operations such as AF (Auto Focus) processing, AE (Auto Exposure) processing, AWB (Auto White Balance) processing, and EF (Electronic Flash pre-emission) processing start.

The second release switch 102b is turned on by a so-called full stroke (shooting instruction) upon completion of the operation of the shutter button 102, generating a second release switch signal SW2. In accordance with the second release switch signal SW2, the system controller 208 starts the operations of a series of shooting processes from reading of a signal from the image sensor 201 up to writing of image data in the external detachable memory 206.

Functions are appropriately assigned to the operation members of the operation unit 104 for each scene by selecting and operating various function icons displayed on the display 101, and these operation members operate as various function buttons. Examples of the function buttons are an end button, return button, image feed button, jump button, narrow-down button, and attribute change button. For example, when the user presses a menu button, the display 101 displays a menu screen capable of various settings. The user can intuitively make various settings using the menu screen displayed on the display 101, a four-way selector button, and a SET button.

One operation member of the operation unit 104 is a touch panel 210 capable of detecting a touch on the display 101. The touch panel 210 and display 101 can be integrated. For example, the touch panel 210 is configured to have a light transmittance at which the display on the display 101 is not hindered, and is attached over the display surface of the display 101. Then, input coordinates on the touch panel 210 and display coordinates on the display 101 are made to correspond to each other. As a result, a GUI can be configured to allow the user to intuitively operate a screen displayed on the display 101.

The system controller 208 can detect the following operations on the touch panel 210: touching the touch panel 210 with a finger or pen (to be referred to as touch-down hereinafter); keeping the finger or pen in contact with the touch panel 210 (to be referred to as touch-on hereinafter); moving the finger or pen kept in contact with the touch panel 210 (to be referred to as move hereinafter); releasing the finger or pen from the touch panel 210 (to be referred to as touch-up hereinafter); a state in which nothing touches the touch panel 210 (to be referred to as touch-off hereinafter); and approach of an object to the touch panel 210. The embodiment will describe an example in which the touch panel 210 is formed from a capacitance type touch panel.

<Proximity Detection Method>

A method of detecting approach to the touch panel 210 according to the embodiment will be explained with reference to FIG. 3.

Figure 3:
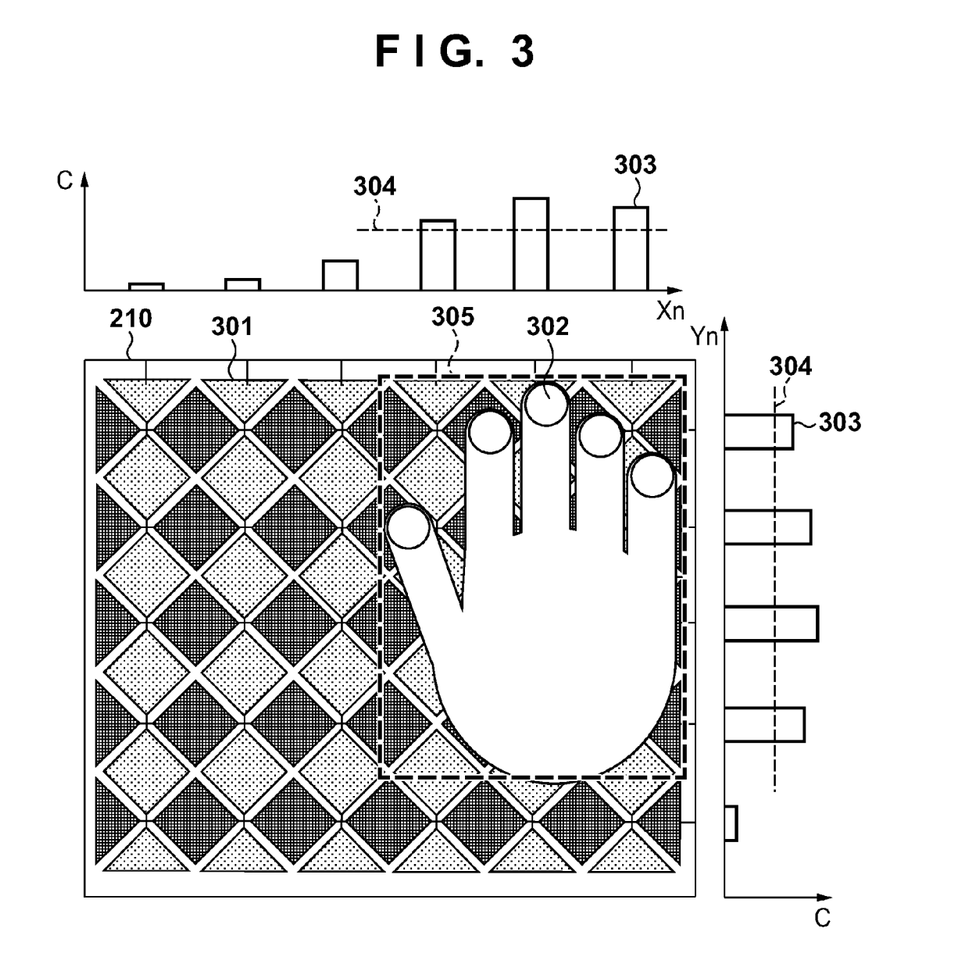
FIG. 3 is a view for explaining the proximity detection function of a touch panel according to the embodiment of the present invention.

Referring to FIG. 3, a plurality of sensor portions 301 are arrayed on the touch panel 210. The sensor portion 301 is a capacitance type touch detection sensor configured to generate a capacitance 303 between the sensor portion 301 and a conductive object 302 such as an approaching finger. A threshold 304 for detecting that the conductive object 302 has come close is set for the generated capacitance 303 serving as a sensor output value. It can therefore be determined that the conductive object 302 has come close to a sensor portion which detects a capacitance exceeding the threshold 304. By detecting approach to a region of the sensor portions 301, the system controller 208 can be notified of a region of the touch panel 210 to which the conductive object 302 has come close. When the entire palm comes close to the touch panel 210, as shown in FIG. 3, capacitances generated in the sensor portions 301 arrayed in the touch panel 210 exceed the threshold 304. From this, it can be determined that a conductive object having a certain area has come close. In addition, a threshold (threshold exceeded upon generation of a larger capacitance) larger than the threshold 304 is set, and whether the touch panel 210 has been touched is detected based on whether a generated capacitance has exceeded the threshold.

The system controller 208 is notified of these operations, and the coordinates of a position where the finger or pen touches the touch panel 210. Based on the notified information, the system controller 208 determines an operation performed on the touch panel 210. As for move, even the moving direction of the finger or pen which moves on the touch panel 210 can be determined for each of vertical and horizontal components on the touch panel based on a change in the position coordinates. An operation from touch-down on the touch panel 210 to a predetermined move and then to touch-up is assumed to be a stroke. A quick stroke operation is called a flick. The flick is an operation of quickly moving a finger kept in contact with the touch panel 210 by a certain distance and then directly releasing it. In other words, the flick is an operation of quickly tracing the touch panel surface like flipping. Upon detecting a move for a predetermined distance or more at a predetermined speed or more and then detecting touch-up, it can be determined that a flick has been performed. If a move for a predetermined distance or more at a speed lower than the predetermined speed is detected, it is determined that a drag has been performed. The touch panel 210 may be of any one of a capacitance type, a surface acoustic wave type, an infrared type, and a type capable of detecting approach to an arbitrary region from an output.

Another operation member 211 includes a mechanical button other than the touch panel 210.

An eye proximity detector 212 is formed from the proximity detection sensor 106 and touch panel 210.

An attitude detector 213 is a sensor circuit which detects the attitude of the image capturing apparatus 100. In this example, the attitude detector 213 is formed from an acceleration sensor and detection circuit. The attitude detector 213 is arranged to be able to detect accelerations in at least the lateral and longitudinal directions (X- and Y-axes) of the display 101. For example, when the attitude detector 213 can detect accelerations along three axes, it is arranged to be able to detect accelerations in the lateral and longitudinal directions (X- and Y-axes) of the display 101 and a direction (Z-axis) perpendicular to the display surface of the display 101.

[First Embodiment]

Display control processing in the first embodiment based on eye proximity detection using a proximity detection sensor and the proximity detection function of a touch panel will be described with reference to FIG. 4. Note that the processing shown in FIG. 4 is implemented by expanding, in a system memory 209, a program stored in a nonvolatile memory 207 and executing it by a system controller 208.

Figure 4:
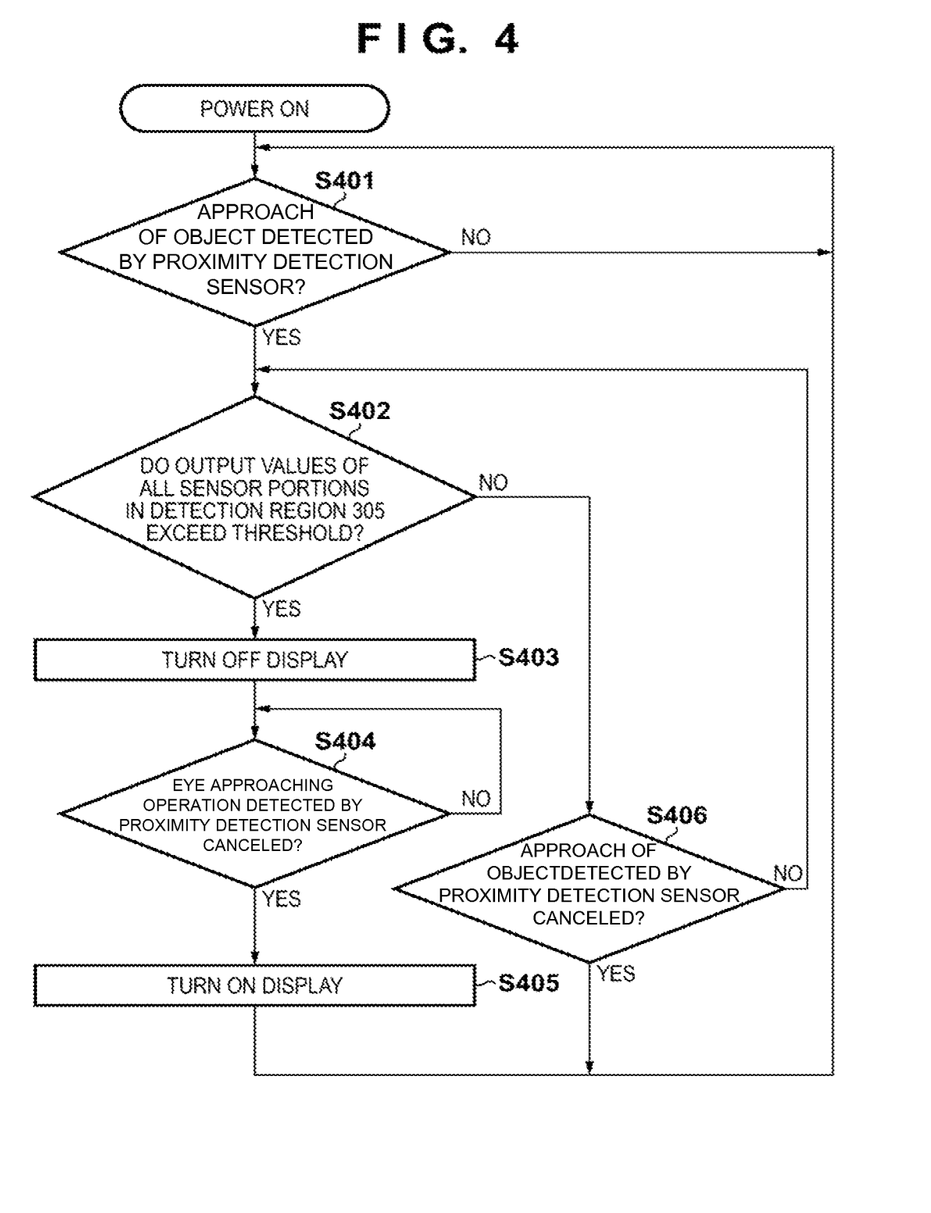
FIG. 4 is a flowchart showing display control processing according to the first embodiment.

In step S401 of FIG. 4, the system controller 208 determines whether an object 107 to be detected has come close. If a light amount equal to or larger than a threshold is detected in a light-receiving lens window 106b of a proximity detection sensor 106, the system controller 208 determines that the object 107 to be detected has come close, and the process shifts to step S402. If no such light amount is detected, the system controller 208 determines that the object 107 to be detected has not come close, and the process returns to step S401.

In step S402, the system controller 208 determines whether the approach of the object 107 to be detected is an eye approaching operation. If output values 303 of all sensor portions in a detection region 305 set on a touch panel 210 exceed a threshold 304, the system controller 208 determines that the approach of the object 107 to be detected is an eye approaching operation, and the process shifts to step S403. If the output values 303 of all sensor portions in the detection region 305 do not exceed the threshold 304, the system controller 208 determines that the approach of the object 107 to be detected is not an eye approaching operation, and the process shifts to step S406. The detection region 305 is set such that, when not a finger but an entire face comes close to the eyepieces viewfinder so that an eye comes close to it, the user's face faces all sensor portions in at least the detection region, and the output values of all sensor portions in the region exceed the threshold 304. That is, in step S402, the system controller 208 determines whether the approach of an object has been detected in a detection region of at least a predetermined range defined by the detection region 305 on the display 101. Although the range of the detection region 305 is set in advance, it may be arbitrarily changed in accordance with a presetting by the user.

In step S403, the system controller 208 turns off a display 101. More specifically, the system controller 208 turns off a backlight which illuminates the display 101. However, this processing may only reduce the luminance of the backlight because it suffices to prevent the user from dazzling. When not an LCD panel but a self-emission display element is employed, the luminance of self-emission may be reduced or self-emission may be stopped. Alternatively, it may be controlled to hide the display on the display 101.

In step S404, the system controller 208 determines whether the eye approaching operation has been canceled. If a light amount equal to or larger than a threshold is not detected in the light-receiving lens window 106b of the proximity detection sensor 106, the system controller 208 determines that the eye approaching operation has been canceled, and the process shifts to step S405. If such a light amount is detected, the system controller 208 determines that the eye approaching operation carries on, and the process returns to step S404.

In step S405, the system controller 208 turns on the display 101, and the process returns to step S401.

In step S406, the system controller 208 determines whether the approach of the object 107 to be detected has been canceled. If a light amount equal to or larger than a threshold is not detected in the light-receiving lens window 106b of the proximity detection sensor 106, the system controller 208 determines that the approach of the object 107 to be detected has been canceled, and the process returns to step S401. If such a light amount is detected, the system controller 208 determines that the approach of the object 107 to be detected carries on, and the process returns to step S402.

As described above, according to the first embodiment, only when the proximity detection sensor 106 detects an approaching finger for a touch operation, the capacitance does not exceed the threshold in the entire detection region 305, and the display 101 is not turned off. That is, the display 101 is turned off only when an object having a certain area or larger comes close.

The first embodiment can prevent the OFF operation of the touch panel and a decrease in operability upon mistaking the approach of the user's head when the user looks through the viewfinder. The first embodiment can solve a problem that, for example, when the display displays a touch icon or the like and a finger comes close to operate the touch icon, the display is turned off and the user cannot correctly touch the touch icon.

It is also possible to stop power supply for driving the sensor portions of the touch panel 210 in step S403, and restart it in step S405. This can reduce power consumption.

The first embodiment has explained processing which gives priority to the result of detection by the proximity detection sensor 106. However, it suffices to give priority to the result of detection by the touch panel 210 and perform display control using the two detection results.

[Second Embodiment]

Display control processing in the second embodiment in which the detection region of a touch panel is changed in accordance with the attitude of an image capturing apparatus will be described with reference to FIG. 5. In the second embodiment, processing in the first embodiment is executed at higher precision by changing the detection region of the touch panel in accordance with the attitude of the image capturing apparatus. Note that the processing shown in FIG. 5 is implemented by expanding, in a system memory 209, a program stored in a nonvolatile memory 207 and executing it by a system controller 208.

Figure 5:
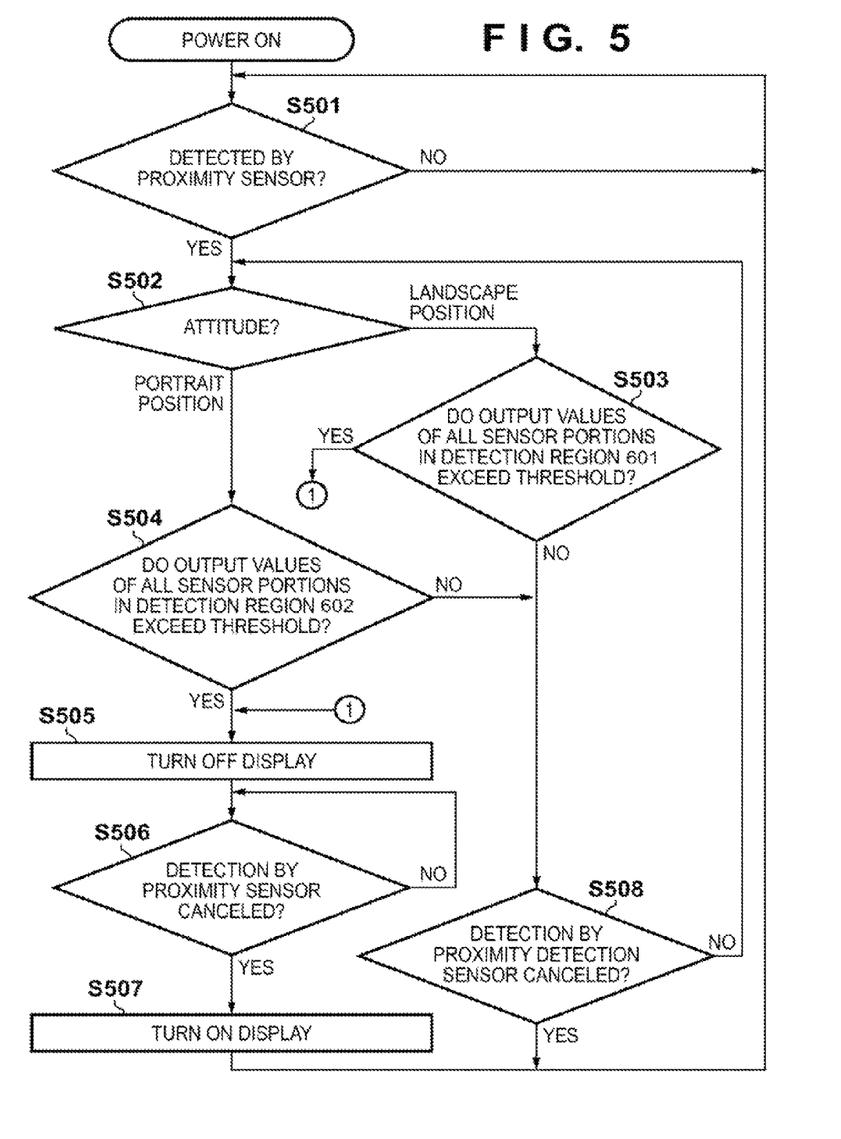
FIG. 5 is a flowchart showing display control processing according to the second embodiment.

Steps S501 and S505 to S508 in FIG. 5 are the same processes as those in steps S401 and S403 to S406 in FIG. 4, and a description thereof will not be repeated.

In step S502, the system controller 208 controls an attitude detector 213 to determine which of the landscape position and portrait position is the attitude of an image capturing apparatus 100. If the attitude of the image capturing apparatus 100 is the landscape position, the process shifts to step S503; if it is the portrait position, to step S504.

In step S503, by using sensor portions in a detection region 601 corresponding to the landscape position, the system controller 208 determines whether the approach of an object 107 to be detected is an eye approaching operation. If output values 303 of all sensor portions in the detection region 601 exceed a threshold 304, the system controller 208 determines that the approach of the object 107 to be detected is an eye approaching operation, and the process shifts to step S505. If the output values 303 of all sensor portions in the detection region 601 do not exceed the threshold 304, the system controller 208 determines that the approach of the object 107 to be detected is not an eye approaching operation, and the process shifts to step S508.

In step S504, by using sensor portions in a detection region 602 corresponding to the portrait position, the system controller 208 determines whether the approach of the object 107 to be detected is an eye approaching operation. If the output values 303 of all sensor portions in the detection region 602 exceed the threshold 304, the system controller 208 determines that the approach of the object 107 to be detected is an eye approaching operation, and the process shifts to step S505. If the output values 303 of all sensor portions in the detection region 602 do not exceed the threshold 304, the system controller 208 determines that the approach of the object 107 to be detected is not an eye approaching operation, and the process shifts to step S508.

Figure 6A:
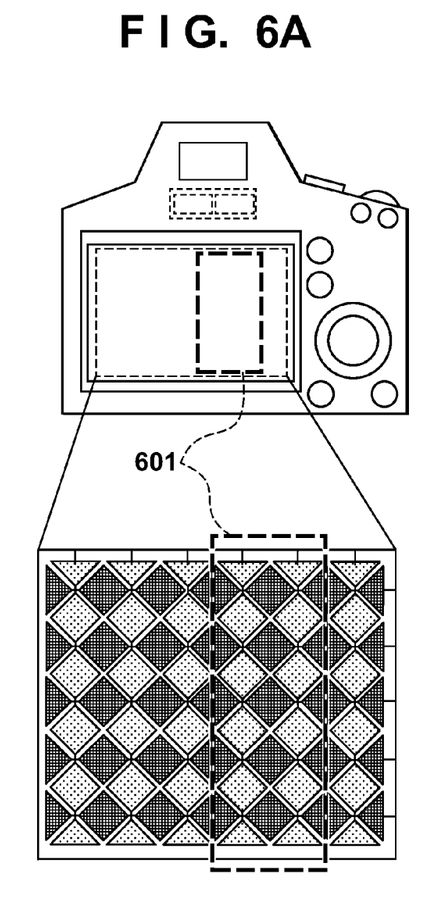
FIGS. 6A and 6B are views for explaining a proximity detection region which changes in accordance with the attitude of an image capturing apparatus according to the second embodiment.
Figure 6B:
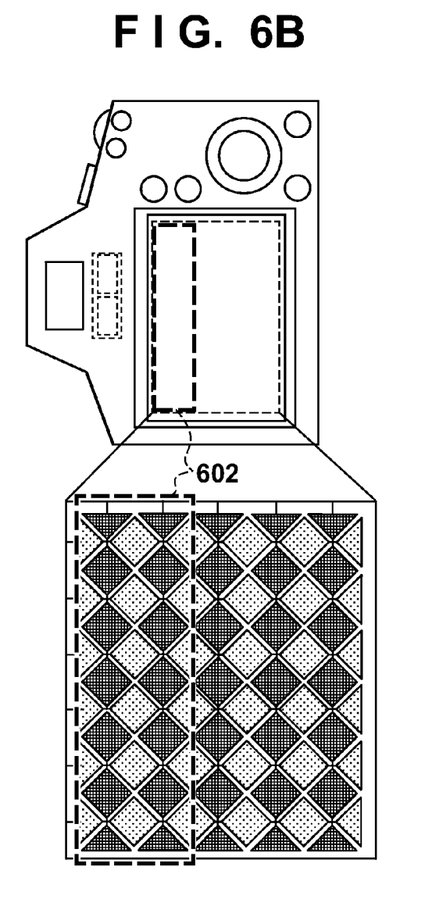

FIGS. 6A and 6B exemplify the setting ranges of the detection regions 601 and 602. In FIG. 6A, the image capturing apparatus 100 is at the landscape position. Whether the approach of the object 107 to be detected is an eye approaching operation is determined by targeting the detection region 601 where it is estimated that the face comes close when the user looks through an eyepiece viewfinder 105 in this state. In FIG. 6B, the image capturing apparatus 100 is at the portrait position. In this case, even if the user looks through the eyepiece viewfinder 105, his face does not overlap the lower portion (right portion at the attitude in FIG. 6B) of the display. For this reason, whether the approach of the object 107 to be detected is an eye approaching operation is determined using the detection region 602 for the portrait position where it is estimated that the face comes close when the user looks through the eyepiece viewfinder 105 at the portrait position.

As described above, the second embodiment changes the detection region of the touch panel in accordance with the attitude of the image capturing apparatus. The second embodiment can prevent the OFF operation of the touch panel and a decrease in operability upon mistaking an operation of looking through the viewfinder.

[Third Embodiment]

Display control processing in the third embodiment in which the detection region of a touch panel is changed in accordance with the dominant eye will be described with reference to FIG. 7. In the third embodiment, processing in the first embodiment is executed at higher precision by changing the detection region of the touch panel in accordance with the dominant eye setting. Note that the processing shown in FIG. 7 is implemented by expanding, in a system memory 209, a program stored in a nonvolatile memory 207 and executing it by a system controller 208.

Figure 7:
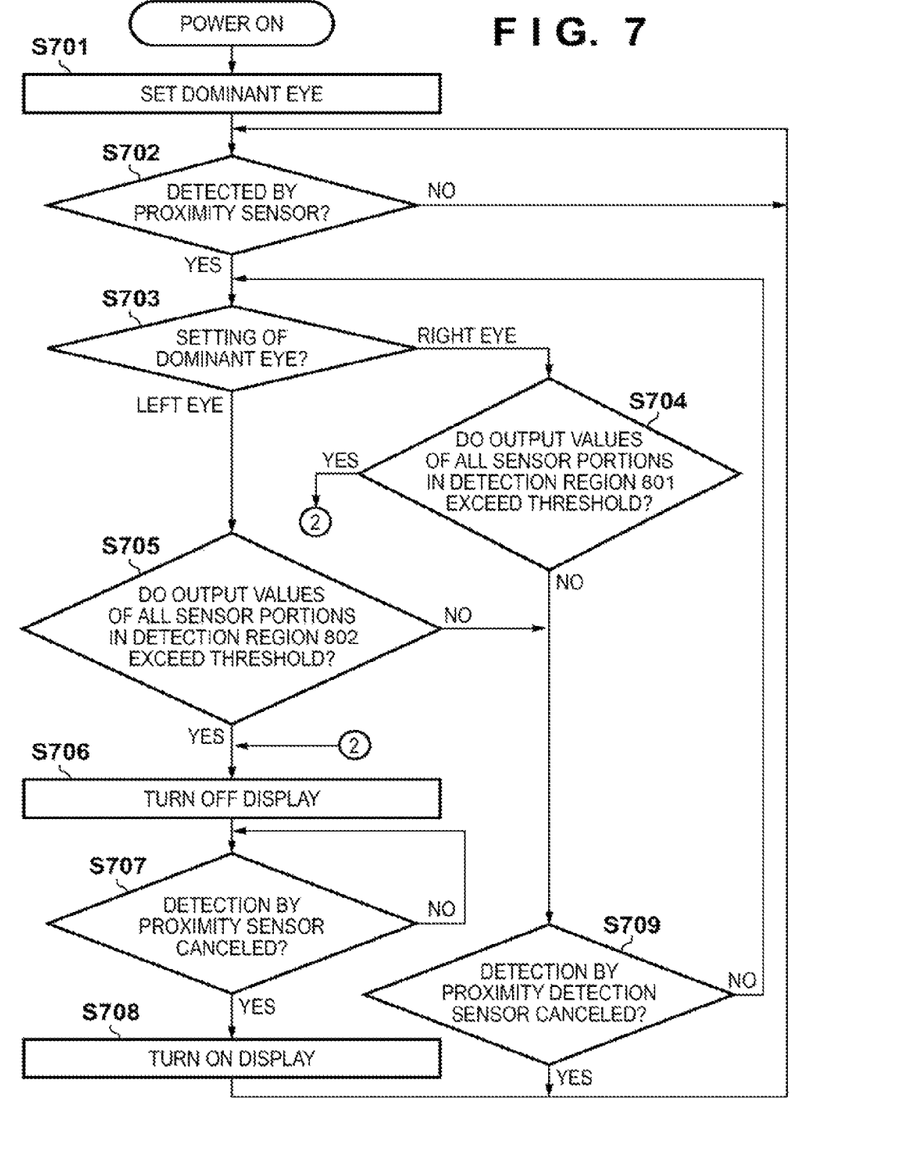
FIG. 7 is a flowchart showing display control processing according to the third embodiment.

Steps S702 and S706 to S709 in FIG. 7 are the same processes as those in steps S401 and S403 to S406 in FIG. 4, and a description thereof will not be repeated.

In step S701 of FIG. 7, if dominant eye information is set by a user operation, the system controller 208 stores the set dominant eye information in the nonvolatile memory 207.

In step S703, the system controller 208 determines the detection region of the touch panel from the dominant eye information set by the user. If the dominant eye is the right eye, the process shifts to step S704; if it is the left eye, to step S705.

In step S704, by using sensor portions in a detection region 801 corresponding to the right eye, the system controller 208 determines whether the approach of an object 107 to be detected is an eye approaching operation. If output values 303 of all sensor portions in the detection region 801 exceed a threshold 304, the system controller 208 determines that the approach of the object 107 to be detected is an eye approaching operation, and the process shifts to step S706. If the output values 303 of all sensor portions in the detection region 801 do not exceed the threshold 304, the system controller 208 determines that the approach of the object 107 to be detected is not an eye approaching operation, and the process shifts to step S709.

In step S705, by using sensor portions in a detection region 802 corresponding to the left eye, the system controller 208 determines whether the approach of the object 107 to be detected is an eye approaching operation. If the output values 303 of all sensor portions in the detection region 802 exceed the threshold 304, the system controller 208 determines that the approach of the object 107 to be detected is an eye approaching operation, and the process shifts to step S706. If the output values 303 of all sensor portions in the detection region 802 do not exceed the threshold 304, the system controller 208 determines that the approach of the object 107 to be detected is not an eye approaching operation, and the process shifts to step S709.

Figure 8A:
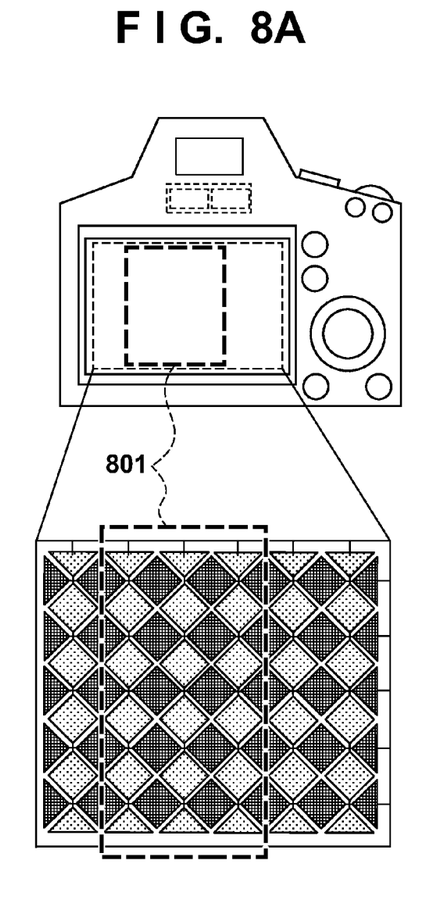
FIGS. 8A and 8B are views for explaining a proximity detection region which changes in accordance with the dominant eye according to the third embodiment.
Figure 8B:
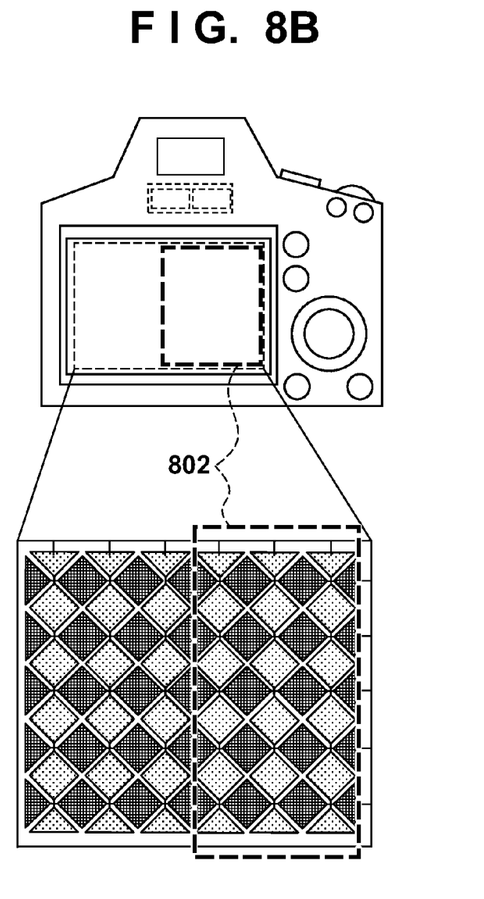

FIGS. 8A and 8B exemplify the setting ranges of the detection regions 801 and 802. When the image capturing apparatus 100 is at the landscape position and the user looks through an eyepiece viewfinder 105 with his right eye, his face does not overlap a region on the display corresponding to the right side of the eyepiece viewfinder. Thus, whether the approach of the object 107 to be detected is an eye approaching operation is determined using not a region on the right side of the eyepiece viewfinder but a region on the left side of the eyepiece viewfinder as the detection region 801 for the right eye, as shown in FIG. 8A. In contrast, when the image capturing apparatus 100 is at the landscape position and the user looks through the eyepiece viewfinder 105 with his left eye, his face does not overlap a region on the left side of the eyepiece viewfinder. Hence, whether the approach of the object 107 to be detected is an eye approaching operation is determined using not a region on the left side of the eyepiece viewfinder but a region on the right side of the eyepiece viewfinder as the detection region 802 for the left eye, as shown in FIG. 8B.

As described above, the third embodiment changes the detection region of the touch panel in accordance with the dominant eye setting. The third embodiment can prevent the OFF operation of the touch panel and a decrease in operability upon mistaking an operation of looking through the viewfinder.

[Fourth Embodiment]

The present invention is not limited to an image capturing apparatus, and is also applicable to a touch panel type mobile phone, smartphone, and the like.

An embodiment in which the present invention is implemented by a mobile phone will be described with reference to FIG. 9.

Figure 9:
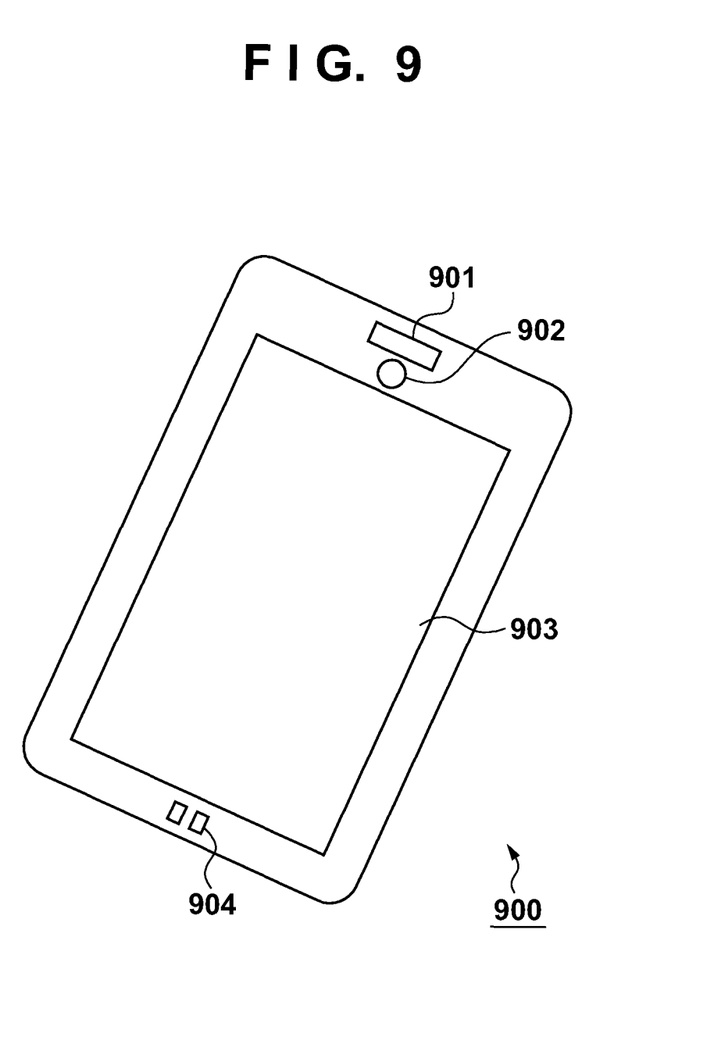
FIG. 9 is a view showing the outer appearance of a mobile phone according to the fourth embodiment of the present invention.

Referring to FIG. 9, a mobile phone or smartphone 900 includes a telephone conversation speaker 901, proximity detection sensor 902, touch panel display 903, and telephone conversation microphone 904. The proximity detection sensor 902 detects that the user's ear has come close to the telephone conversation speaker 901.

In the embodiment, when an ear has come close to the speaker 901 to have a telephone conversation, the proximity detection sensor 902 detects the approach of the object. Upon detecting the approach of the object, the display on the touch panel disappears (by turning off the light, darkening the display, or hiding it) to prevent dazzling in telephone conversation and save power.

Even in this mobile phone, when a finger comes close to it to operate the touch panel, the proximity detection sensor 902 detects that the approach of the object. In response to this, the touch panel may be turned off to hinder the touch operation. Even in this case, by applying the display control processing in FIG. 4, it can be prevented to turn off the touch panel and impair operability upon mistaking the approach of a finger for that of an ear.

Note that control by the system controller 208 may be performed by one hardware unit, or a plurality of hardware units may share processing to control the overall apparatus.

The present invention is not limited to these specific embodiments, and includes various forms without departing from the gist of the invention. Further, each embodiment described above is merely an embodiment of the present invention, and the embodiments can be appropriately combined.

In the above-described embodiments, the present invention is applied to an image capturing apparatus or mobile phone. However, the present invention is not limited to the above examples, and is also applicable to a PDA, portable image viewer, digital photo frame, music player, game machine, electronic book reader, and the like as long as such an electronic device turns off the touch panel upon detecting the approach of an object.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-247964, filed Nov. 11, 2011, which is hereby incorporated by reference herein in its entirety.

What is claimed is:

1. A display control apparatus comprising:
a display unit;
a proximity detection unit configured to detect that an object has come close to the apparatus;
a touch detection unit configured to be able to detect that an object has come close to said display unit and to detect a touch operation on said display unit; and
a control unit configured to, when said proximity detection unit detects approach of the object and said touch detection unit detects the approach of the object in a region of not smaller than a predetermined range on said display unit, control not to perform a display on said display unit, to reduce a luminance of said display unit, or to turn off said display unit, and when said proximity detection unit detects the approach of the object and said touch detection unit does not detect the approach of the object in the region of not smaller than the predetermined range on said display unit, control to carry on the display on said display unit and to accept a touch operation on said display unit.

2. The apparatus according to claim 1, wherein the display control apparatus includes an image capturing apparatus including an image capturing unit configured to capture a shooting object, and said proximity detection unit detects approach of an object to an eyepiece viewfinder of the image capturing apparatus.

3. The apparatus according to claim 1, further comprising an attitude detection unit configured to detect which of a portrait position and landscape position is an attitude of the display control apparatus, wherein said control unit changes the predetermined range in accordance with which of the portrait position and landscape position is the attitude of the display control apparatus.

4. The apparatus according to claim 1, further comprising a setting unit configured to set a dominant eye of a user, wherein said control unit changes the predetermined range in accordance with which of a right eye and left eye is the dominant eye set by said setting unit.

5. The apparatus according to claim 1, wherein the display control apparatus includes a mobile phone, and said proximity detection unit detects approach of an object to a telephone conversation speaker of the mobile phone.

6. The apparatus according to claim 1, wherein said control unit controls not to perform a display on said display unit, to reduce the luminance of said display unit, or to turn off said display unit, and to stop power supply to said touch detection unit.

7. The apparatus according to claim 1, wherein said touch detection unit includes a capacitance type touch detection sensor.

8. The apparatus according to claim 1, wherein said proximity detection unit emits infrared light and detects, based on a reflected light amount of the infrared light, that the object has come close.

9. A display control method of an apparatus which has a display unit; a proximity detection unit configured to detect that an object has come close to the apparatus; and a touch detection unit configured to be able to detect that an object has come close to said display unit and to detect a touch operation on said display unit, the method comprising:
a control step of, when the proximity detection unit detects approach of the object and the touch detection unit detects the approach of the object in a region of not smaller than a predetermined range on the display unit, controlling not to perform a display on the display unit, to reduce a luminance of the display unit, or to turn off the display unit, and when the proximity detection unit detects the approach of the object and the touch detection unit does not detect the approach of the object in the region of not smaller than the predetermined range on the display unit, controlling to carry on the display on the display unit and accepting a touch operation on said display unit.

10. A non-transitory computer-readable storage medium storing a program for causing a computer to execute the display control method according to claim 9.

11. The apparatus according to claim 1, wherein after controlling not to perform the display on said display unit, to reduce a luminance of said display unit, or to turn off said display unit, when said proximity detection unit does not detect the approach of the object, said control unit controls to return to a display state before controlling not to perform the display on said display unit, to reduce a luminance of said display unit, or to turn off said display unit regardless of detection result of said touch detection unit.

12. The apparatus according to claim 11, wherein when said proximity detection unit detects the approach of the object and said touch detection unit detects the approach of the object in a region of not smaller than the predetermined range on said display unit, said control unit controls to stop power supply to said touch detection unit, and after controlling not to perform the display on said display unit, to reduce a luminance of said display unit, or to turn off said display unit, when said proximity detection unit does not detect the approach of the object, said control unit controls to start power supply to said touch detection unit again regardless of detection result of said touch detection unit.

* * * * *